United States Patent [19]

Teschner et al.

[11] 4,298,356

[45] Nov. 3, 1981

[54] PROCESS FOR THE MANUFACTURE OF ABRASIVES

[75] Inventors: Eckart Teschner, Hünstetten; Richard Sattelmeyer, Schlangenbad; Wolfgang Hesse, Wiesbaden, all of Fed. Rep. of Germany

[73] Assignee: Hoechst Aktiengesellschaft, Frankfurt am Main, Fed. Rep. of Germany

[21] Appl. No.: 100,910

[22] Filed: Dec. 6, 1979

[30] Foreign Application Priority Data

Dec. 13, 1978 [DE] Fed. Rep. of Germany ....... 2853761

[51] Int. Cl.$^3$ ............................................. B24D 11/00
[52] U.S. Cl. ........................................ 51/297; 51/295; 51/298
[58] Field of Search ...................... 51/295, 298, 298.1, 51/297

[56] References Cited

U.S. PATENT DOCUMENTS

| | | | |
|---|---|---|---|
| 2,248,853 | 7/1941 | Carlton et al. | 51/298 |
| 3,016,294 | 1/1962 | Haywood | 51/298 |
| 3,089,763 | 5/1963 | Gladstone | 51/295 |
| 3,861,892 | 1/1975 | Wisdom et al. | 51/298 |
| 4,018,574 | 4/1977 | Dyer | 51/295 |
| 4,035,961 | 7/1977 | Pemrick et al. | 51/295 |
| 4,175,931 | 11/1979 | Teschner | 51/298 |

*Primary Examiner*—Donald E. Czaja
*Assistant Examiner*—W. Thompson
*Attorney, Agent, or Firm*—Hammond & Littel, Weissenberger and Muserlian

[57] ABSTRACT

Process for the manufacture of an abrasive material comprising at least two binder layers formed from at least one aqueous resol I prepared from a monohydric phenol and formaldehyde (molar ratio of phenol to formaldehyde 1:(1.1 to 2.5)) by the application of a first binder layer onto a carrier material, scattering abrasive particles thereon, drying the covering layer in a horizontal dryer to displacement resistance and thereafter cooling with an air stream, application of a second binding agent layer and in similar manner to the first step, drying to imprint resistance and thereafter cooling, whereby the heating and cooling are each effected by means of an air stream through slit nozzles arranged transversely to the direction of travel of the abrasive web and, after loosely forming the product into a roll, final curing is effected on the product in roll form, the coated carrier material being conveyed at speeds above 5 m/min through the dryers which have well defined and individually controllable heating and cooling zones and the air stream has a velocity of 5 to 200 m/s at the nozzle outlets and a temperature of 20 to 300° C., the air being extracted through adjacent extraction nozzles.

10 Claims, No Drawings

PROCESS FOR THE MANUFACTURE OF ABRASIVES

The object of the present invention is to provide a process for the manufacture of high-performance abrasives on a flexible substrate by means of flash drying in a flat web dryer and subsequent curing of the abrasives in roll form in heat cabinet.

In order to manufacture abrasives on a flexible substrate, the carrier material is first coated with a thin film of a liquid binding agent, called the primary binding agent. This may optionally contain fillers. The abrasive particles are generally scattered onto this film of binding agent electrostatically, and thus acquire a desired orientation of their longitudinal axes at right angles to the surface of the carrier material. After the scattering of the particles the semifinished product passes through a heat duct in which the binding agent is dried or cured. In general, the binding agent must be hardened to the extent that the abrasive material can no longer be displaced, disorientated or broken off upon further treatment. This process mostly takes 0.5 to 3 hours depending on the particle size to which the layer thickness of the binding agent is adjusted, in the course of which the temperature is increased in certain steps from 20° C. to 110° to 120° C. A second thicker binding agent layer in most cases containing calcium carbonate filler, (called the covering binding agent) is then applied, and this is then treated in similar fashion in a heat duct for 3 to 6 hours at a temperature of 20° C. rising to 120° to 130° C. until curing is complete.

In order to enable such long dwell times to be avoided and at the same time to allow high production to be achieved the heat ducts must necessarily be designed as hanging ducts heated with circulating hot air, such as hanging dryers or festoon dryers, and which must have lengths of up to 100 m for drying the basic binding agent (predrying or intermediate loop) and up to several hundred meters for drying the covering binding agent (main loop).

This manufacturing process therefore necessitates high investment costs and makes it difficult to obtain a constant quality in the products because regular temperature distribution is impossible owing to the dimensions of the hanging ducts; the hot air cannot be conveyed to the hanging webs of material at the high speed desired and the synthetic resin binding agent may be liquified to the extent that it may run due to the vertical arrangement of the abrasive web when the drying temperature is increased to too high a value. Furthermore, the fairly sharp bends at the saddle points or in the lower loop parts of the hanging material represent potential defects or breaks in the material. A frequent consequence of the heat gradient which inevitably arises is different degrees of hardening in narrow strips and the formation in parts, of bubbles together with uneconomically long drying and hardening times.

German Offenlegungsschrift No. 2146369 mentions the possibility of manufacturing abrasives using flat web dryers, but features enabling this type of process to be put into practice are not disclosed therein. Consequently, doubts have been expressed by persons skilled in the art about the possibility of practical exploitation of such processes.

It is also proposed in German OLS No. 2644552 to modify flat web dryers conventional to other branches of industry in a way suitable for the abrasives industry and to employ them for the manufacture of abrasives. However, it is necessary in so doing to use an aqueous mixture of at least one resol and a polyvinyl alcohol as the binding agent, optionally together with further conventional additives. In this way, the basic binding agent layer is dried to displacement resistance (as hereinafter defined) and the covering binding agent layer is dried to imprint resistance (as hereinafter defined) each at a temperature of 100° to 140° C., using a horizontal heat duct provided with nozzles for the introduction of air and after each drying phase cooling is effected by means of an air current of at most 40° C., preferably 10° to 25° C., to 20° to 40° C., preferably 25° to 30° C., cooling being effected in less than 3 minutes, preferably less than 1 minute.

By 'displacement resistance' is meant the degree of drying which after cooling of the semi-finished product to about 25° C. no longer permits disorientation, displacement or breaking-off of the abrasive material. The covering layer is said to be "imprint resistant" when after cooling to about 25° C. no traces of the binding agent are left on white writing paper pressed thereon with finger pressure.

The abrasives provided with the dried covering binding agent layer are loosely rolled up and curing according to a process conventional in the abrasives industry is effected on the product in roll form, for example by gradual heating to 100° to 140° C. in a heated cabinet in which air circulates and by cooling the material below 50° to 60° C. In this way the hot air and cooling air are conveyed so that they flow predominantly in an axial direction through the rolled material. Curing in the heat cabinet is effected according to a temperature-time curve, whereby the temperature rises over 2 to 15, preferably 5 to 10 hours, gradually from 20° to 100° to 140° C., preferably 105° to 120° C. and subsequently falls over 5 to 20, preferably 7 to 16 hours to at most 60° C., preferably at most 50° C. Subsequently the material is reconditioned, the duration of this process depending on the material and amounting generally to 2 to 48 hours. Curing and reconditioning may be effected in the same chamber or the reconditioning may be effected in a special separate cabinet.

Such heat cabinets are much more economical than the hanging dryers hitherto employed, the previous high costs of apparatus being eliminated and, moreover, the installation requires much less space.

In the above-mentioned process for the manufacture of abrasives in a horizontal drying installation it has been possible hitherto only to employ combinations of phenolic resins and polyvinyl alcohol, whereby the drying of the polyvinyl alcohol by physical means brings about the necessary rapid drying up to displacement resistance and imprint resistance. The use of polyvinyl alcohol is possible only if it is added in the form of a diluted, for example 10 to 40% aqueous solution or in solid form together with water. There is thereby introduced into the binding agent system a considerable proportion of water, the evaporation of which during the drying operation necessitates, on the one hand, an additional consumption of energy and, on the other hand, especially careful handling in order to prevent bubble formation and other disturbances.

It is therefore desirable to provide a process for the flash drying of abrasives in horizontal dryers, which can be effected without the use of polyvinyl alcohol and which results in qualitatively high quality, heavy-duty abrasives. This is an object of the present invention.

The object of the invention is a process for the manufacture of abrasives comprising at least two layers of binding agent formed from at least one aqueous resol I prepared from a monohydric phenol and formaldehyde with a molar ratio of the phenol to formaldehyde of 1:1.1 to 1:2.5 optionally with the addition of further conventional additives, wherein a first binding agent layer is applied to a substantially flat flexible carrier material, abrasive particulate material is scattered thereon and the binding agent layer is dried up to displacement resistance using a horizontal drying installation and is thereafter cooled by means of an air stream, a second binding agent layer of the same or different type is applied and is dried to imprint resistance in the manner specified in the first step and thereafter cooled, the heating and cooling each being effected by means of slit nozzles arranged transversely to the direction of travel of the abrasive web and after loosely forming the product into a roll the final curing is effected, on the product in the form of a roll by conventional means, in which process the coated carrier material is conveyed at speeds above 5 m/min. through a drying installation having sharply defined and individually controllable heating and cooling zones and the product contacts an air stream with a velocity of 5 to 200 m/s at the nozzle outlet and an air temperature at the outlet of 20° to 300° C. depending on the temperature zone, the air being drawn off through adjacent extraction nozzles. This process thus permits flash drying in a horizontal intensive drying installation.

Horizontal intensive dryers through which the abrasive is conveyed horizontally or approximately horizontally are intended, for example flat bed dryers and horizontal heat ducts which are designed in the way described hereinafter.

The horizontal drying unit through which the abrasive web passes horizontally stretched flat or slightly convex, for example on rolls, rollers, conveyor belts or air cushions is provided with nozzles for outlet of the gaseous heating medium (for example hot air) at a minimum uniform spacing from the abrasive web. This is in contrast to the conventional flat web dryers, especially the hanging dryers. This guarantees high circulating capacities and high blowing rates of the heating medium, which lie at 5 to 200, preferably 20 to 100 m/s, and simultaneously a small volume in said drying unit.

The small volume is achieved due to a small height of the inner space of the drying installation, which is generally 10 to 60 cm, preferably 15 to 40 cm. The blowing nozzles which are made slit-shaped, extend transversely to the direction of run of the abrasive web over the entire web width. They alternate with extraction openings which are also slit-shaped. At least one extraction nozzle must be aligned parallel to each blowing nozzle. Cooling air may also be blown onto the non-coated side of the coated carrier material during the heating and/or cooling of the coating; the supply of cooling air solely on the non-coated side is of advantage especially in the treatment of the covering layer. The nozzles are arranged, for example, at a spacing of 2 to 50 cm, preferably 3 to 20 cm above the coating or, if the cooling air is blown onto the non-coated side, from the carrier material. Short spacings between the nozzles and the coating as well as a high blowing rate carry the turbulence of the heating medium up to the surface of the binding agent and thereby guarantee an extra-ordinarily high transfer of heat.

Due to the above-described arrangement and mode of operation, heat gradients transverse to the direction of run are excluded, so that the binding agents can be treated in each drying stage with the maximum permissible quantity of heat and at the highest temperature, limited by the appearance of permanent bubbles in the binding agent, and can consequently be dried and also hardened in the shortest possible time. This arrangement makes possible the supply of high quantities of heat to the binding agent layer and thus a high drying rate in the first stage, without there being the risk of dripping of the liquefied phenol resin due to the rapid temperature increase.

Whereas, for example in the hanging drying of the covering binding agent, the energy supply is inhibited to a large degree by the flow limit of the binding agent, in horizontal drying no account needs to be taken of the liquefaction of the binding agent; on the contrary, the energy supply is deliberately forced up to the stage at which the binding agent boils vigorously. This results, on the one hand, in a shortening of the drying times from 30 to 60 to 2 to 5 minutes (a reduction of about one tenth), and, on the other hand, gives an exceptionally good flow of the binding agent and an optimal anchoring of the abrasive material. A decisive factor in the method is the abrupt cessation of the drying operation in the critical phase of the transition of the energy supply from supplying the enthalpy of vaporisation of water to supplying the reaction enthalpy, that is in the phase in which the supplied energy becomes no longer available for the evaporation of the "solvent water", but for the continuation of condensation reactions. This is made possible just by the above-described constructive features of the horizontal intensive dryer and the specified type of cold air action. If the energy supply were continued beyond the critical phase, the considerable quantities of vapour arising spontaneously from the condensation products of water and formaldehyde could no longer escape from the tough plastic resin; a bubbly or foamy, and consequently weakened binding structure would be obtained. Of decisive importance in the heating effect on the binding agent layer is the quantity of heat energy which is conveyed by the heating medium to the surface of the binding agent. This heat quantity is defined by the temperature and the throughput of the blown heating medium, the throughput being dependent, in turn, on the velocity and the nozzle cross section.

The temperature of the heating medium at the nozzle outlet in the intensive drying zones is at least 100° C., advantageously 120° to 300° C., preferably 150° to 250° C. The rate of recirculation of the heating medium is 50 to 95%, preferably 70 to 90%. The heating of the heating medium may be effected in a conventional way, for example via heat exchangers which are operated with superheated steam, highboiling liquids or other mdia; however, it is effected preferably directly with flue gases, whereby a part of the flue gases extracted from the drying installation is returned to the combustion zone where it is mixed with 5 to 50%, preferably 10 to 30% fresh air to maintain combustion and whence it is supplied again to the drying duct and so on. The combustion chamber is designed, for example as an intensive turbulent chamber, so that the remaining harmful substances emitted from the phenol resin are substantially completely converted to $CO_2$ and $H_2O$ upon passage through the heating flame. Moreover, if the preferred resin systems are used, a further considerable reduction of the proportions of harmful substances, such as phenol fractions, formaldehyde and the like, may be achieved, so that the waste air contains hardly any harmful substances.

In comparison with a hang-drying installation, the horizontal intensive drying installation employed according to the invention also permits a substantial energy saving which, besides the predominant conveyance of dry air in the circuit, is brought about primarily by its compact construction—it has only 3 to 10% of the surface of a hang-drying installation with the same output—and due to the better insulation capacity associated therewith.

A further substantial advantage of the horizontal intensive drying according to the invention in comparison with hang-drying is the careful treatment of the carrier materials which, irrespective of whether cotton fabric, paper or vulcanised fibre are concerned, consist of cellulose fibres which react to a long treatment with hot dry air with sharply falling elasticity and tearing strength values. In the horizontal intensive drying applied according to the invention the temperature, even though it is high, acts only briefly upon the coating and the carrier material remains largely unaffected. Additionally, the underside may be cooled by air without prejudicing the progress of drying.

It is therefore possible to bring about the desired solidification of the individual layers under the conditions according to the invention with the exclusion of foam or bubble formation or other structural defects in the layer of binding agent, so that the thermomechanical properties of the hardened synthetic-resin binding agent are maintained or are improved so that better products are obtained.

At least one layer of binding agent consists preferably of an aqueous mixture of various phenol resins, namely of at least one resol I prepared from a monohydric phenol with a molar ratio of the phenol to formaldehyde of 1:1.1 to 1:2.5, preferably 1:1.3 to 1:2.2, which is preferably predominantly in the form of the ortho-isomers, and of at least one condensation product II of a phenol component of 10 to 100 molar % polyhydric phenols and 0 to 90 molar % monohydric phenols with formaldehyde, the molar ratio of the quantities of formaldehyde used to the sum of the phenols being (0.6 to 1.5):1.

Suitable as component I are preferably those phenol resins which are prepared by the addition and/or condensation of formaldehyde to monohydric phenols in the presence of alkalis or alkaline earths as catalyst. The catalysts may remain in the resin or be partly or completely removed or neutralised. It is also possible to incorporate into the resin a part of the formaldehyde in non-reactive form, for example in the form of methylene bridges. For this purpose, the same catalysts as those specified above or acids may be used at elevated temperatures. Employed as component II having a high potential condensation rate with formaldehyde are mixed condensates of monohydric phenols, formaldehyde and polyhydric phenols, for example resorcinol, pyrocatechol or pyrogallol or condensates of at least one of the polyhydric phenols with formaldehyde. In the preparation of the mixed condensates it is necessary to ensure that the known rapid reactivity of the polyhydric phenol, for example of resorcinol, is substantially maintained.

As a group of monohydric phenols which may be used in the preparation of components I and II mention is made of m-cresol, 3,5-xylenol and preferably phenol, $C_6H_5OH$. However, alkyl phenols with 1 to 9 carbon atoms in the alkyl radical may also be used in mixture with phenol, for example o-cresol, alkyl phenols with 1 to 9 carbon atoms in the alkyl radical, especially with the alkyl in p-position, such as p-cresol, p-butyl- or p-octyl-phenol. The proportion of phenol is at least 50 molar %.

The preparation of the resin component I is effected in a conventional way; for example, monohydric phenol is reacted with polymeric formaldehyde and/or aqueous solutions of formaldehyde, generally at temperatures between 30° and 100° C., preferably between 30° and 80° C., until the required degree of condensation is obtained. The degree of condensation is characterised by the viscosity and generally lies between 200 and 2000, preferably 300 to 1000 mPa.s/20° C. The catalysts used are, for example sodium hydroxide, potassium hydroxide, magnesium oxide, calcium hydroxide or barium hydroxide. They are employed generally in quantities of 0.01 to 0.9 moles, preferably 0.05 to 0.7 moles, relative to the phenolic hydroxy groups. The resin content of the aqueous solutions generally lies between 50 and 90%, preferably between 60 and 80%. It may be set by distillation or fixed from the outset by selection of the concentration of the reaction partners. The phenol resin solutions obtained during preparation may be used as such. To improve the stability in storage, it is often appropriate to neutralise the catalyst employed. To improve the solubilities in water and further to improve the stability in storage, watersoluble alcohols such as methanol, ethanol, propanol, etc., polyhydric alcohols such as glycols or glycerol in quantities between 1 and 20, preferably between 2 and 10% by weight, relative to the total quantity of the binding agent, may also be added.

There may be used as component II phenol-formaldehyde resins prepared in conventional way from 1 mole of polyhydric phenol with less than 1 mole, preferably 0.5 to 0.8 moles of formaldehyde in the presence of 0.05 to 0.9, preferably 0.1 to 0.6 moles of alkali hydroxide, for example as potassium or sodium hydroxide. Advantageously, however, component II consists of mixed condensates of monohydric phenol, formaldehyde and polyhydric phenols, preferably dihydric phenols, for example resorcinol. These may be prepared by first preparing a phenol resol and subsequently reacting same, for example with resorcinol. For this purpose, 1 mole of monovalent phenol, generally in the presence of 0.1 to 0.9, preferably 0.2 to 0.6 moles of alkali or alkaline earth hydroxide, preferably sodium hydroxide, is reacted generally with 1.1 to 1.9, preferably 1.3 to 1.8 moles of formaldehyde at temperatures between 30° and 100° C., preferably 40° to 80° C., until the formaldehyde is consumed. This reaction mixture then has added thereto generally 0.11 to 2.0, preferably 0.2 to 1.5 moles of polyhydric phenol and reaction is effected under the same conditions until a degree of condensation characterised by viscosity measurements is obtained. That is generally the case when the viscosity is 100 to 2000, preferably 200 to 1000 mPa.s/20° C. The molar ratio of the quantities of formaldehyde used to the sum of phenol and polyvalent phenols may be at most 1.5:1 and lies preferably between 0.7 and 1.3:1. However, it is not appropriate to use less formaldehyde than 0.6 moles. These resins may be mixed, like the above-described component I, with the above-mentioned alcohols in the said quantities.

The resin components thus prepared are generally very stable in storage in themselves. Also mixtures of different phenol resols I and mixed condensates II with one another may be employed as mixture components.

The components I and II are generally mixed in a mixture ratio of 95:5 to 60:40, preferably 90:10 to 70:30 to form a binding agent liquor which contains optionally conventional filling materials such as calcium carbonate, gypsum, kaolin, cryolite, etc. in conventional quantities. These additives are mostely added not to the basic binding agent, but to the covering binding agent. These mixtures are distinguished in that they contain only small quantities of free formaldehyde and in that also upon heating to higher temperatures, even those lying above the processing temperature, phenol and especially formaldehyde are discharged into the environment in substantially reduced quantities.

Due to their especially high reactivity which is not achieved by components I and II in themselves, the abovementioned resin combinations are especially suitable for the flash drying process according to the invention. The phenol resin combinations preferably used for this process are distinguished from the application of combinations of phenol resins and polyvinyl alcohol additionally by a lower viscosity and consequently by a higher proportion of solids in the coating material and a higher abrasive capacity.

Due to the process according to the invention it becomes possible to lower the investment costs for the installations for the manufacture of abrasives, to shorten the drying times and reduce energy consumption, to lessen the emission of substances detrimental to the environment and to enhance the quality of the abrasive thus manufactured.

To be considered as substrates for the manufacture of abrasives are, in general, flexible materials such as paper, fabric, vulcanized fibre, fleece material, films and the like. Suitable as abrasive particulate material are all conventionally used materials such as sand, emery, silicon carbide, granular aluminium oxide and the like.

The heating and cooling air for hardening in the coil are introduced preferably in an axial direction in the process according to the invention, but this direction is not obligatory. It is appropriate to cause the air to flow axially through the coil, that is between the abrasive webs, forcibly, that is by means of a flexible sleeve placed tightly around the loosely wound coil.

In the following Examples T signifies parts by weight and % signifies percentage by weight.

EXAMPLES (Preparation of resol component I)

1. Phenol resin A:

940 T of phenol are melted in a reaction vessel equipped with agitator and thermometer and are mixed with 186 T of 37% aqueous formaldehyde solution. 38 T of 33% sodium hydroxide are then added thereto at 50° C., the temperature rising to 60° C. Subject to the exothermic reaction 420 T of paraformaldehyde (91%) are subsequently added in portions and the mixture is stirred until the resin has a viscosity of 600 mPa.s/20° C. After the addition of 80 T of methanol cooling is effected and a pH value of 4.8 to 5.3 is adjusted with dilute sulphuric acid. The yield of finished resin is quantitative, residue: 68% (the residue is determined by heating a sample of 2 g for 1 hour to 135° C.), viscosity: 350 mPa.s/20° C., increasing after storage for 6 weeks at room temperature to 407 mPa.s/20° C.

2. Phenol resin B:

Example 1 is repeated, but the addition of methanol and sulphuric acid is omitted. The resin has a viscosity of 650 mPa.s/20° C. and a residue (2 g, 1 hour, 135° C.) of 72%.

3 to 5. Mixtures of resin A and resin B are prepared each with the following phenol resin C.

Phenol resin C:

940 T of phenol and 200 T of a 37% aqueous formaldehyde solution are heated to 40° C. with stirring and 600 T of a 33% sodium hydroxide solution are added thereto. The temperature may not exceed 60° C. Subject to the exothermic reaction there are subsequently added at 60° C. a further 610 T of an aqueous 37% formaldehyde solution as well as 198 T of paraformaldehyde (91%) and the mixture is maintained at this temperature until no more free formaldehyde is present. 440 T of resorcinol are then added and the mixture is stirred at 60° C. until a viscosity of 300 mPa.s/20° C. is obtained, whereupon it is cooled. Resin residue: 62%, yield: quantitative. The viscosity increases after storage for 6 weeks at room temperature to only 333 mPa.s/20° C.

6. Mixture of resin A with the following resorcinol novolak D:

660 T of resorcinol and 75 T of water are melted and mixed with 3 T of 12.5% sulphuric acid. To the melt heated to 110° C. are added 390 T of an aqueous 30% formaldehyde solution and the mixture is left at this temperature until the formaldehyde content is 0%. The resin is cooled to 80° C. and mixed with 432 T of 33% sodium hydroxide solution. Residue: 65%, yield: quantitative, viscosity: 2640 mPa.s/20° C.

7. Mixture of a resorcinol novolak E1 with a phenol resol E2

Resorcinol novolak E1:

440 T of resorcinol and 50 T of water are melted and mixed with 2 T of 12.5% sulphuric acid. To the melt heated to 115° C. are added 211 T of an aqueous 37% formaldehyde solution and the mixture is left at this temperature until the formaldehyde content is 0%.

Phenol resin E2:

940 T of phenol are melted and mixed with 720 T of sodium hydroxide solution (33%) and heated to 60° C. At this temperature 614 T of a 37% formaldehyde solution as well as 205 T of paraformaldehyde (91%) are added subject to the exothermic reaction and the mixture is left at this temperature until the formaldehyde content is 0%. The cooled total quantity of resin (described under E1) is added to this mixture and is heated to 70° C. until the viscosity is 145 mPa.s/20° C. Residue: 57.5%, yield: quantitative.

Manufacture of the abrasives—Comparative tests between the horizontal intensive dryer and hang-dryer:

A vulcanised fibre made specially for the abrasives industry and having a thickness of 0.8 mm and a weight per unit area of about 1000 g/m2 is coated with the basic binding agent in a wet film thickness of 75 μm and scattered with standard corundum (electrocorundum) of particle size 80 in a quantity of 400 g/m2. The test mixtures listed in the following table are used as basic binding agent. The samples in the table are treated thereafter as follows:

Horizontal intensive dryer:

Predrying is effected at 120° C. in the time specified in the table and cooling is subsequently effected to 30° C. in 20 seconds with a cold air stream.

Hang-dryer:

The temperature is increased uniformly from 40° to 90° C. in the time specified in the table.

The covering binding agent is then applied in a wet film quantity of 200 g/m2. The covering binding agent used is the respective phenol resin mixture mixed with the same quantity of limestone powder (mean grain size 10 μm). The layer of covering binding agent is then dried as follows:

Horizontal intensive dryer

Predrying is effected at 150° C. in the time specified in the table and cooling to 30° C. is subsequently effected in 20 seconds with a cold air stream.

Hang-dryer:

The temperature is increased uniformly from 40° to 110° C. in the time specified in the table.

All the samples are hardened in rolled form whereby the temperature is raised in 12 hours uniformly from 20° C. to 110° C. and then lowered again uniformly from 110° C. to below 40° C. in 10 hours in a closed kiln and the heating and cooling air is conveyed through the coil in an axial direction. The samples are subsequently reconditioned for 24 hours at 25° C. and about 90% relative atmospheric moisture. Round discs with an outside diameter of 178 mm and an inside diameter of 22 mm are stamped out of the coated vulcanised fibre and the binding agent layer is flexed in a conventional way.

Abrasive test:

The discs undergo an abrasive test which is based on the principle of "edge rubbing." In so doing, they are pressed with an angle of incidence of their plane of rotation of 25° with a contact pressure of 80 N onto the edge of a 3 mm thick chrome-nickel steel sheet. The rate of revolution is 3200 rev/min. and the rubbing time is 9 minutes. The weight loss V of the abrasive discs is measured and the weight A of the removed steel and consequently the abrasive index I=A/V is computed. Practically the same abrasive index is obtained with the samples processed by means of the horizontal intensive dryer and by means of the hang dryer.

nol is considerably limited in comparison with the samples 1 and 2 with only one phenol resin (see columns 8 and 9). Nevertheless, samples 1 and 2 also show a technical advance in comparison with the time spent with the hang dryer due to the simpler and quicker mode of manufacture. The last column of the table indicates that the abrasive index can be controlled by varying the phenol resin combination and especially favourable abrasive index values can thereby be obtained with low emission values and a rapid mode of manufacture.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

We claim:

1. In a process for the preparation of an abrasive material having two binder layers comprising the following steps
   (i) applying a first binder layer of a flexible sheet-like support;
   (ii) scattering abrasive particles onto the said first binder layer;
   (iii) drying the product of step (ii) in a horizontal drying unit and subsequently cooling the product in an air stream, the drying process being effected for a time sufficient to allow the said first binder layer to attain sufficient adhesive strength to prevent displacement of the abrasive particles disposed therein when the product is cooled;
   (iv) applying a second binder layer as sizer to the cooled product of step (iii);
   (v) drying the second binder layer in a horizontal drying unit and subsequently cooling the product, heating and cooling being effected in similar manner to that of step (iii), the drying process being effected for a time sufficient to allow the said second binder layer to become imprint resistant;
   (vi) loosely rolling up the product of step (v) and
   (vii) curing the product of step (vi);
   wherein at least one of the said first and second binder

TABLE

| Test No. | Binding agent (the same for basic and covering layers) | | | | Predrying Basic binding/ covering binding | | Emission from 50 μm film 1 hour, 100° C. | | Abrasive index A/V |
|---|---|---|---|---|---|---|---|---|---|
| | Component I | | Component II | | Horizontal | Hang | | | |
| | Phenol resin proportion % | | Phenol resin proportion % | | intensive dryer min. | dryer min. | formaldehyde % | phenol % | |
| 1 | A | 100 | — | — | 9.0/8.0 | 65/85 | 0.9 | 6.2 | 7.7 |
| 2 | B | 100 | — | — | 8.0/7.0 | 70/95 | 1.0 | 7.0 | 7.5 |
| 3 | A | 90 | C | 10 | 3.0/3.0 | 40/75 | 0.2 | 5.0 | 8.3 |
| 4 | A | 80 | C | 20 | 2.5/2.2 | 35/70 | 0.1 | 2.9 | 9.0 |
| 5 | B | 80 | C | 20 | 4.0/3.5 | 40/70 | 0.2 | 4.1 | 8.8 |
| 6 | A | 80 | D | 20 | 3.5/3.0 | 35/50 | 0.1 | 3.1 | 7.5 |
| 7 | A | 80 | E1 + E2 | 20 | 5.5/5.0 | 40/50 | 0.3 | 4.2 | 7.0 |

Discussion of the results

As shown by columns 6 and 7 of the foregoing table, the consumption of time in the mode of operation with the hang dryer is at least six times as high as with the process according to the invention using a horizontal intensive dryer.

Furthermore, the table reveals that when a binding agent consisting of different phenol resins is used (see samples 3 to 7) the emission of formaldehyde and phelayers comprises at least one aqueous resol I which resol has been prepared from a monohydric phenol and formaldehyde in a molar ratio of phenol:formaldehyde of between 1:1.1 and 1:2.5, the improvement comprising that at least one of said binder layers consists of said resol I and at least one resol condensation product II prepared from 100 to 10 mole% of a polyhydric phenol and 0 bis 90 mole% of a monohydric phenol and formaldehyde wherein the molar ratio of the starting amount of formaldehyde to the total amount of the phenols is (0.6 to 1.5):1, in the absence of polyvinyl alcohol, conveying the coated carrier material at speed of above 5 m/min through the said drying units having well defined independently controllable heating and cooling zones wherein the coated carrier material is contacted with an air stream emitted from slit nozzles arranged transversely to the direction of travel of the coated material, the air stream having a velocity between 5 and 200 m/sec at the nozzles outlets and an outlet temperature between 20° and 300° C. dependent on the temperature zone and drawing of air off with adjacent suction nozzles.

2. A process according to claim 1 wherein the resol I is based on phenol and formaldehyde in a molar ratio between 1:1.3 and 1:2.2.

3. A process according to claim 1 wherein at least one of the said binder layers contains a condensation product II which contains between 1.3 and 1.8 moles of condensed formaldehyde and between 0.2 and 1.5 moles of a polyhydric phenol per mole of monohydric phenol and wherein the molar ratio of formaldehyde to the total amount of phenols is (0.7 to 1.3):1.

4. A process as claimed in claim 1 wherein each drying step is performed within less than 5 minutes.

5. A process as claimed in claim 1 wherein each drying step is performed at a temperature between 110° and 160° C.

6. A process as claimed in claim 1, wherein the step (vii) is effected by heating and cooling the product with an air stream conveyed through the rolled up material in an axial direction.

7. A process as claimed in claim 1 wherein the coated flexible support is passed through the heating and cooling zones with a speed between 10 and 200 m/min.

8. A process as claimed in claim 1 wherein the air stream has a velocity between 20 and 100 m/s over the whole breadth of the sheet, the space between slit nozzles and the coating being between 2 and 50 cm.

9. A process as claimed in claim 1 wherein during heating and cooling the non-coated face of the flexible support is contacted with a cooling air stream.

10. In a process for the preparation of an abrasive material having two binder layers comprising the following steps:
  (i) applying a first binder layer to a flexible sheet-like support;
  (ii) scattering abrasive particles onto the said first binder layer;
  (iii) drying the product of step (ii) in a horizontal drying unit and subsequently cooling the product in an air stream, the drying process being effected for a time sufficient to allow the said first binder layer to attain sufficient adhesive strength to prevent displacement of the abrasive particles disposed therein when the product is cooled;
  (iv) applying a second binder layer as sizer to the cooled product of step (iii);
  (v) drying the second binder of layer in a horizontal drying unit and subsequently cooling the product, heating and cooling being effected in similar manner to that of step (iii), the drying process effected for a time sufficient to allow the said second binder layer to become imprint resistant;
  (vi) loosely rolling up the product of step (v) and
  (vii) curing the product of step (vi); wherein at least one of the aid first and second binder layers comprises at least one aqueous resol I which resol has been prepared from a monohydric phenol and formaldehyde in a molar ratio of phenol:formaldehyde of between 1:1.1 and 1:2.5, the improvement comprising that at least one of said binder layers consists of said resol I and at least one resol condensation product II prepared from 100 to 10 mole% of a polyhydric phenol and 0 to 90 mole% of a monohydric phenol and formaldehyde wherein the molar ratio of the starting amount of formaldehyde to the total amount of the phenols is (0.6 to 1.5):1, in the absence of polyvinyl alcohol, conveying the coated carrier material at speed of about 5 m/min through the said drying units having well defined, independently controllable heating and cooling zones wherein the coated carrier material is contacted with an air stream emitted from slit nozzles arranged transeverely to the direction of travel of the coated material, the air stream having a velocity between 5 and 200 m/sec at the nozzle outlets and an outlet temperature between 20° and 300° C. dependent on the temperature zone and drawing the air off with adjacent suction nozzles, as claimed in claim 1 wherein at least one of the said binder layers contains a condensation product II which contains between 1.3 and 1.8 moles of condensed formaldehyde and between 0.2 and 1.5 moles of a polyhydric phenol per mole of monohydric phenol and wherein the molar ratio of formaldehyde to the total amount of phenols is (0.7 to 1.3):1, the viscosity of the resol is between 300 and 1000 mPa.s/20° C., the resin content of the aqueous solution of the resin is between 60 and 80% and a space between the slit nozzles and the coating being between 2 and 50 cm.

* * * * *